US011720882B2

(12) United States Patent
Kurylko et al.

(10) Patent No.: US 11,720,882 B2
(45) Date of Patent: Aug. 8, 2023

(54) IDENTITY DEEP FREEZE

(71) Applicant: MASTERCARD INTERNATIONAL INCORPORATED, Purchase, NY (US)

(72) Inventors: Marek Kurylko, Bloomfield, NJ (US); Joseph Hayes, Montclair, NJ (US); Eugene Reda, Little Falls, NJ (US)

(73) Assignee: Mastercard International Incorporated, Purchase, NY (US)

( * ) Notice: Subject to any disclaimer, the term of this patent is extended or adjusted under 35 U.S.C. 154(b) by 382 days.

(21) Appl. No.: 16/744,613

(22) Filed: Jan. 16, 2020

(65) Prior Publication Data
US 2021/0224788 A1  Jul. 22, 2021

(51) Int. Cl.
*G06Q 20/34* (2012.01)
*G06Q 20/38* (2012.01)
*H04L 9/32* (2006.01)
*G06F 21/62* (2013.01)

(52) U.S. Cl.
CPC ....... *G06Q 20/354* (2013.01); *G06F 21/6245* (2013.01); *G06Q 20/3829* (2013.01); *H04L 9/3213* (2013.01); *G06F 2221/2153* (2013.01)

(58) Field of Classification Search
CPC ............. G06Q 20/354; G06Q 20/3829; G06Q 20/3552; G06Q 20/4014; G06Q 20/405; G06F 21/6245; G06F 2221/2153; H04L 9/3213
USPC .......................................................... 705/71
See application file for complete search history.

(56) References Cited

U.S. PATENT DOCUMENTS

| 7,739,169 | B2 * | 6/2010 | Hammad | G06Q 20/10 705/35 |
| 7,774,270 | B1 * | 8/2010 | MacCloskey | G06Q 40/00 705/38 |
| 9,256,904 | B1 * | 2/2016 | Haller | G06Q 40/00 |
| 10,831,424 | B1 * | 11/2020 | Alacar | H04W 12/06 |
| 10,937,027 | B1 * | 3/2021 | Sokol | G06Q 20/3821 |
| 10,956,594 | B2 * | 3/2021 | VanLoo | H04L 63/102 |
| 2003/0046246 | A1 * | 3/2003 | Klumpp | G07F 7/025 705/64 |
| 2003/0217001 | A1 * | 11/2003 | McQuaide, Jr. | G06Q 20/105 705/41 |
| 2008/0208726 | A1 * | 8/2008 | Tsantes | G06Q 40/00 705/35 |
| 2010/0250411 | A1 | 9/2010 | Ogrodski | |
| 2015/0188979 | A1 * | 7/2015 | Almeras | H04L 67/10 709/217 |

(Continued)

*Primary Examiner* — Zeshan Qayyum
(74) *Attorney, Agent, or Firm* — Barta, Jones & Foley, PLLC (57) ABSTRACT

System and methods perform identity freezing. A user input requesting halting of operations related to a plurality of accounts or profiles of the user at different local systems is received. In response, a token mapping database is accessed to identify a personally identifiable information (PII) token for the user. A freeze message with the PII token is transmitted to the different local systems to halt operations associated with the plurality of accounts or profiles of the user. Thereafter, at the different local systems, the operations associated with the plurality of accounts or profiles of the user are halted to freeze an identity of the user. More efficient communication and operations to freeze the user accounts and profiles thereby result.

14 Claims, 7 Drawing Sheets

(56) References Cited

U.S. PATENT DOCUMENTS

| | | | |
|---|---|---|---|
| 2016/0180330 A1 | 6/2016 | Feldman | |
| 2016/0189121 A1* | 6/2016 | Best | G06Q 20/405 |
| | | | 705/40 |
| 2017/0147631 A1* | 5/2017 | Nair | G06F 16/2379 |
| 2018/0342001 A1* | 11/2018 | Chavarria | G06Q 20/10 |
| 2019/0228173 A1* | 7/2019 | Gupta | G06F 21/6245 |
| 2021/0049560 A1* | 2/2021 | Kulpati | G06Q 20/02 |

* cited by examiner

IDENTITY DEEP FREEZE

BACKGROUND

Consumers occasionally lose their payment card. A lost payment card can be detrimental not only to the consumer, but also to merchants, issuers, and payment networks. When a payment card is lost, the consumer has to notify their issuer to cancel the card and prevent any future transactions. The issuer will then print and send a new payment card to the consumer.

If a single payment card is lost, a single call, such as to the bank, often is all that is needed to halt future transactions, cancel the payment card, and have a new payment card issued. However, if multiple payment cards or other transaction cards are lost or stolen, such as if a wallet is lost or stolen, a person can spend hours calling banks, credit agencies, and even government departments. Every minute that goes by increases the risk of someone using the card(s) and/or other information to steal savings, open a fraudulent account, go on a shopping spree, etc.

Thus, with present systems and procedures, the process to handle lost or stolen payment cards can become very time consuming and frustrating as the number of lost and/or stolen payments cards increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for identity freezing comprises receiving a user input requesting halting of operations related to a plurality of accounts or profiles of the user at different local systems. The method further comprises accessing, in response to receiving the user input, a token mapping database to identify a personally identifiable information (PII) token for the user, and transmitting a freeze message with the PII token to the different local systems to halt operations associated with the plurality of accounts or profiles of the user. The method also comprises halting, at the different local systems, the operations associated with the plurality of accounts or profiles of the user to freeze an identity of the user.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to freeze a plurality of user accounts and/or profiles, such as when payment cards are lost or stolen. In some examples, an automated process allows quick freezing of all compromised financial accounts and credit agency profiles, as well as to notify government agencies. With the present disclosure, a universal proxy is created for an individual from a single interface (e.g., Mastercard® cardholder account), across all financial institutions, credit agencies, and government administrations, among other entities. Through network connectivity to each of these entities, the individual's identity is put in a deep freeze on a global scale, with the press of a button, and without having to make telephone calls or individually access each of the individual's accounts. The individual is able to perform the global operations via a single relationship (e.g., one bank relationship). As a result, improved anti-fraud procedures are provided by the present disclosure that has improved connectivity and scale.

The systems and methods thereby save considerable amounts of time, as well as increase the level of automation in management of financial accounts and agency profiles, particularly when an individual's identity is compromised, such as when the individual's wallet is stolen. In this manner, when a processor is programmed to perform the operations described herein, the processor is used in an unconventional way, and allows for more efficient communication and operations to freeze the individual's accounts ad profiles (e.g., financial accounts and agency profiles).

As described in more detail herein, with the click of a button, a global freeze operation is performed instead of having to communicate individually with a plurality of institutions and entities. In some examples, a registration process is performed at a single bank system, and with the present disclosure, global communication is provided with other entities to allow a user to instantaneously or near-instantaneously halt transactions from being performed by a number of different (and unrelated) financial institutions, credit agencies, government administrations, etc. That is, simultaneous or concurrent halting of transactions occurs rapidly by a single freezing operation implemented using the systems, methods, and/or infrastructure of the present disclosure.

Figure 1:
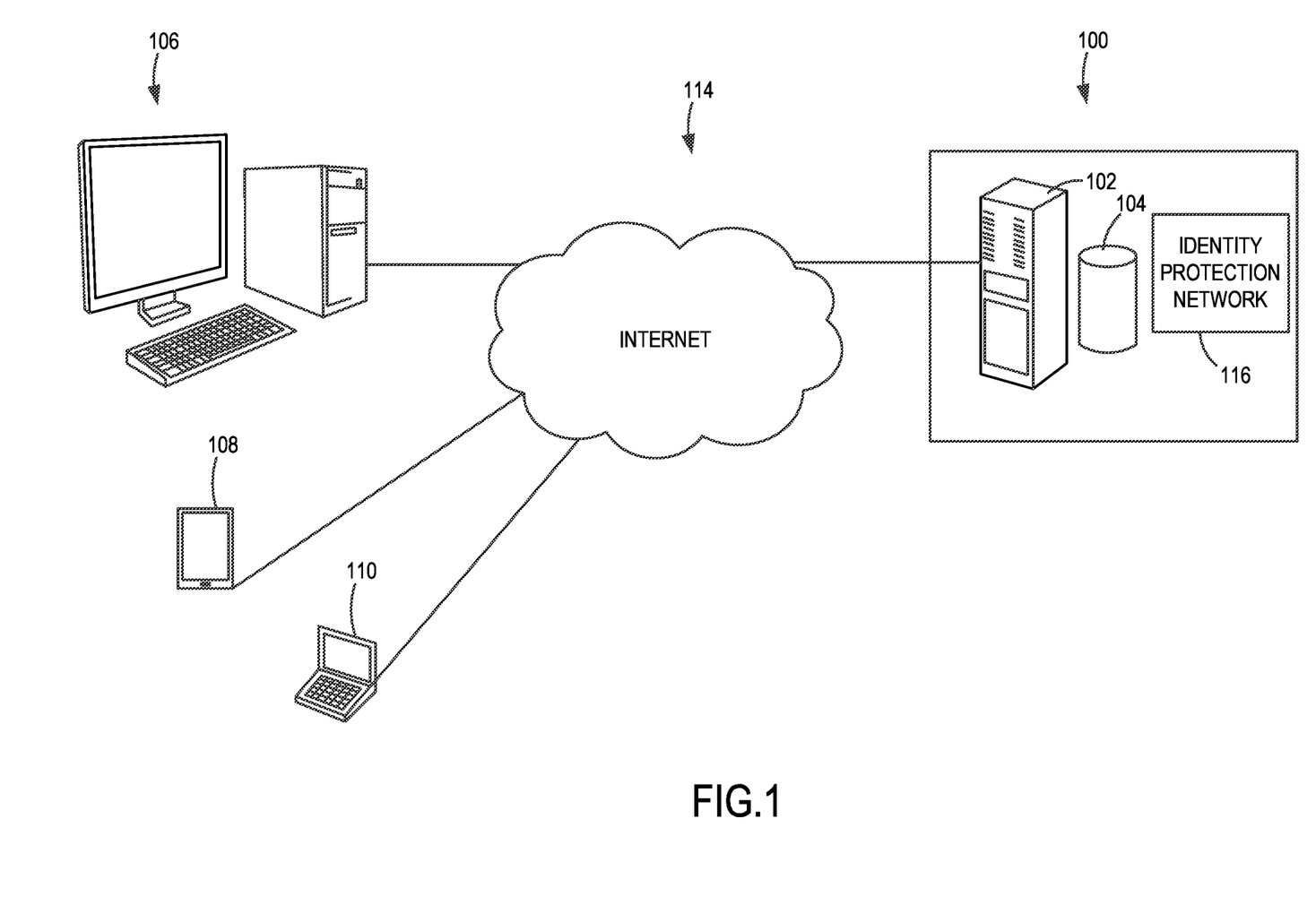
FIG. 1 is a block diagram illustrating a system having an identity protection network according to an embodiment.

FIG. 1 is a schematic block diagram of a system 100 deployed as a cloud service in this example that allows for freezing operations to be performed as described in more detail herein. The system 100 includes one or more computers 102 and storage 104 to store personally identifiable information (PII), such as a unique PII token for a plurality of registered users. The system 100 is connected to one or more end user computing devices, such as a desktop computer 106, a smart phone 108 and a laptop computer 110. For example, the system 100 is shown as connected to the end user computing devices via a computer network 114, illustrated as the Internet, which allows the user, for example, to register, access, and activate various aspects of the present disclosure to perform the freezing operations and prevent further access or use of the user's accounts, identity, and/or personal information at financial institutions, credit agencies, government administrations, etc.

In one particular example, the system 100 receives user registration information by accessing a single point of contact (e.g., a bank's website) from one of the end user computing devices. For example, a user registers for deep freeze protection to allow global blocking of access to the user's accounts, identity, and/or personal information at financial institutions, credit agencies, government administrations, etc. Once registered, the user is able to easily manage the user's accounts, identity, and/or personal information at financial institutions, credit agencies, government administrations, etc. from a single interface. For example, a user is able to selectively identify one or more accounts, profiles, identity, and/or personal information at financial institutions, credit agencies, government administrations, etc. that are included in the deep freeze protection, which can be dynamically changed as desired or needed.

The system 100 uses an identity protection network 116 according to the present disclosure to prevent access to the user's accounts, identity, and/or personal information at financial institutions, credit agencies, government administrations, etc. that are registered with the identity protection network 116 (i.e., participate in the deep freeze protection). For example, the identity protection network 116 in some examples is a backend server that allows communication with systems associated with the user's accounts, identity, and/or personal information at different financial institutions, credit agencies, government administrations, etc. to allow a user to quickly and easily halt transactions with the user's accounts, identity, and/or personal information at the different financial institutions, credit agencies, government administrations, etc. by validating a single tokenized PII.

Thus, the system 100 allows global communication with a plurality of systems with which the user has accounts. For example, through the identity protection network 116, the system allows communication with a plurality of payment systems and/or networks. The payment systems and/or networks in some examples are any systems or networks used for the transfer of money via the use of cash-substitutes. Payment networks can use a variety of different protocols and procedures in order to process the transfer of money for various types of transactions. Transactions that can be performed via a payment network include, for example, product or service purchases, credit purchases, debit transactions, fund transfers, account withdrawals, etc. Payment networks can be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. It should be noted that use of the term payment network herein can refer to both the payment network as an entity, and the physical payment network, such as the equipment, hardware, and software comprising the payment network.

Continuing with the payment network example, using the tokenized PII, communication with a plurality of payment systems is provided to freeze a plurality of transaction accounts of the user associated with the PII. The financial accounts, in some examples, are accounts that can be used to fund a transaction, such as a checking account, savings account, credit account, virtual payment account, etc. A transaction account can be associated with a consumer, which can be any suitable type of entity associated with a payment account, and include a person, family, company, corporation, governmental entity, etc. In some instances, a transaction account can be virtual, such as accounts operated by PayPal®, etc.

Thus, when a user loses or has payment cards stolen, the present disclosure allows a simple and efficient process to freeze the plurality of transaction accounts of the user associated with the PII, such that the payment cards cannot be used. The present disclosure is particularly beneficial when a number of payment cards are lost or stolen, such as when the user's wallet is stolen. That is, with a single click operation at the user's bank or other account website, transactions associated with the plurality of the user's accounts, identity, and/or personal information at financial institutions, credit agencies, government administrations, etc. are halted.

It should be noted that a payment card, in various examples, is a card or data associated with a transaction account that can be provided to a merchant in order to fund a financial transaction via the associated transaction account. Payment cards include, for example, credit cards, debit cards, charge cards, stored-value cards, prepaid cards, fleet cards, virtual payment numbers, virtual card numbers, controlled payment numbers, etc. A payment card can be a physical card provided to a merchant, or can be data representing the associated transaction account (e.g., as stored in a communication device, such as a smart phone or computer). For example, in some instances, data including a payment account number can be considered a payment card for the processing of a transaction funded by the associated transaction account. In some examples, a check is considered a payment card.

With the present disclosure, a user (e.g., a consumer) can have payment cards that are issued by different issuers, such as different issuing financial institution, for example different issuing banks, easily frozen. Conventionally, if for example, the user's wallet is stolen, the user has to call or communicate with each of the entities associates with the various credit cards to at least initially have transactions associated with all of the payment cards in the user's wallet halted. However, with the present disclosure, the user simply accesses the deep freeze functionality at his or her bank website, and with a single click, is able to halt transactions from being performed using a plurality of stolen payment cards. For example, by communicating the tokenized PII of the user via to the entities associated with the stolen payment cards using the identity protection network 116, the system 100 is configured to freeze or otherwise deactivate the transaction accounts associated with the payment cards. As such, payments are declined until a new payment card is issued (or recovery of the payment card has been confirmed in the case where the payment card is lost, but not stolen, such as by unfreezing the associated account via a user interface as described in more detail herein).

The methods and systems discussed herein thereby facilitate the fast and efficient halting of transactions being performed by the user's financial institutions, credit agencies, government administrations, etc. For example, lost payment cards can be reported quickly and easily using the simplified interface of the present disclosure that allows global communication with the entities at which the user has registered accounts. It should be noted that freezing an account can be performed using any suitable process at the user's financial institutions, credit agencies, government administrations, etc. That is, the freezing is performed using local operations at the user's financial institutions, credit agencies, government administrations, etc. As one example, freezing the payment card includes updating an activation flag in a specific account profile associated with the user (as identified by the tokenized PII transmitted to the issuer of the payment card) to indicate the payment card as being inactive.

Figure 2:
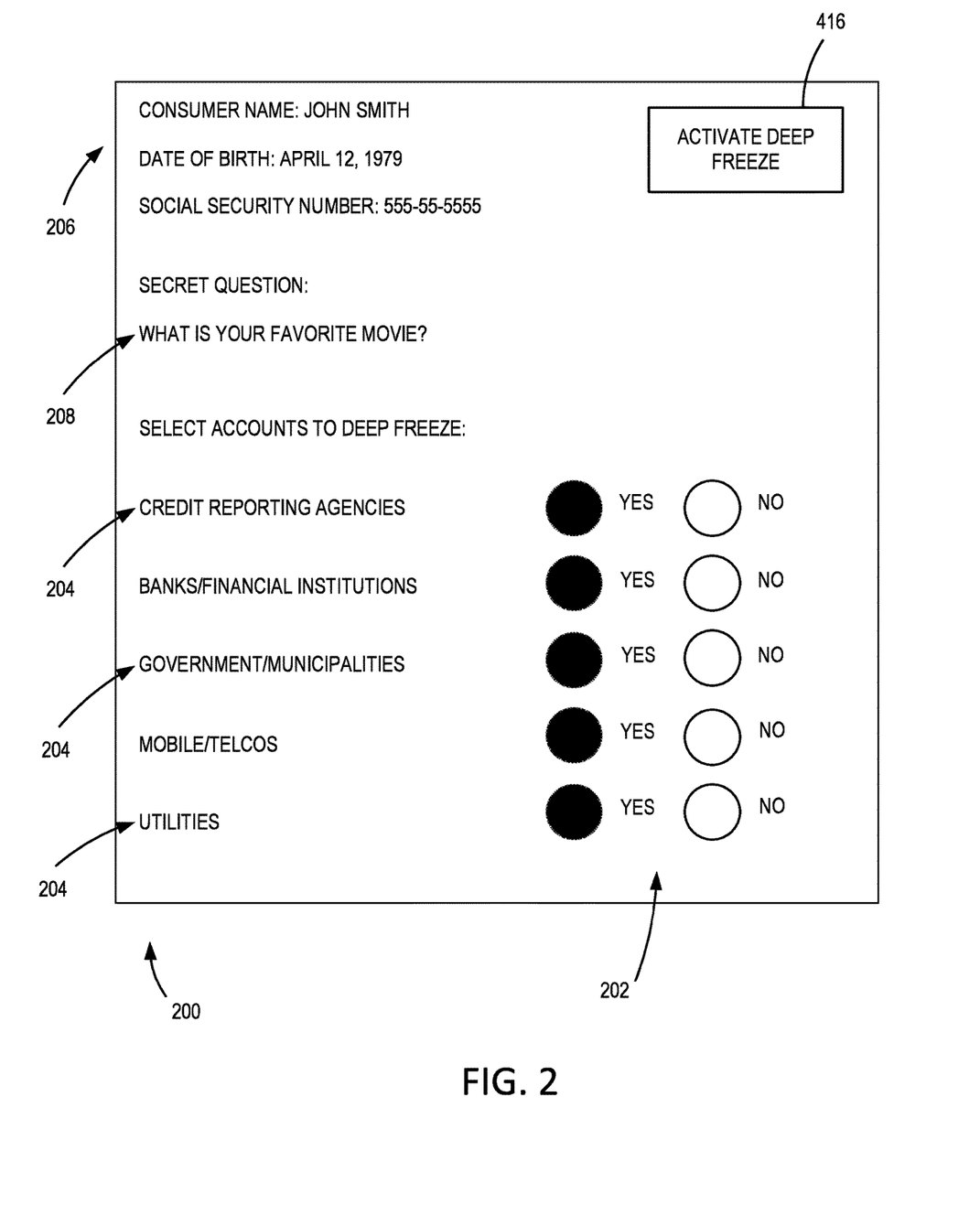
FIG. 2 illustrates a user interface according to an embodiment.

The registration of various user accounts to allow deep freeze functionality is performed via a single user interface, such as the user interface 200 illustrated in FIG. 2. The user interface 200 in some examples is an online banking enrollment form accessed at the online banking site of the user's bank. However, it should be appreciated that the user interface 200 can be implemented in connection with systems associated with non-banking entities or can be a standalone registration system. The registration allows the user to selectively enroll or activate accounts that are registered with the identity protection network 116 (shown in FIG. 1). That is, a plurality of user selectable activation elements 202 (e.g., YES and NO selectable elements) allows a user to identify different accounts at financial institutions, credit agencies, government administrations, etc. that are protected by the systems and methods of the present disclosure.

In the illustrated example, the user interface allows the user to select the particular type of account 204 that participates in the deep freeze protection. That is, in this example, the user selectively activates or deactivates categories of accounts (e.g., credit reporting agencies, banks/financial institutions, government/municipality entities, mobile/telecommunication companies, and utilities) to be registered, and which can be dynamically changed at a later time. It should be noted that the types of accounts 204 are illustrated merely for example and additional or fewer types of accounts or sub-types can be included. In some examples, particular entities are listed, such as the issuer of particular payment cards, etc.

The user accesses the user interface 200 by entering personal information in the website, such as the username and password of the user at the bank's online website. The user interface 200 shows personal information 206 (e.g., name, date of birth and social security number) for the user, which may be automatically populated based on the information associated with the user's bank account. In some examples, the user enters this information during the registration process. The personal information 206 is used in various examples to generate the tokenized PII transmitted to the various entities registered and participating in the deep freezing as selected by the activation elements 202. In some examples, a network wide standard is used to tokenize a PII stream, such that the tokens create a user proxy that is used during the deep freezing operation.

Additional information can also be entered, such as recovery information in the event a password is lost. In the present example, a secret question 208 is selected with the answer entered. However, as should be appreciated, different password recovery or secondary validation functionality can be provided as configured using online security technology.

It should be noted that the types of accounts 204 or specific account information that is displayed can be automatically populated using account identification technology that allows for identifying the user's accounts via his or her social security number. In some examples, additional accounts or types of accounts can be added by the user by entering the user's specific account information. In other examples, this information is initially entered by the user for all accounts to be included.

Figure 3:
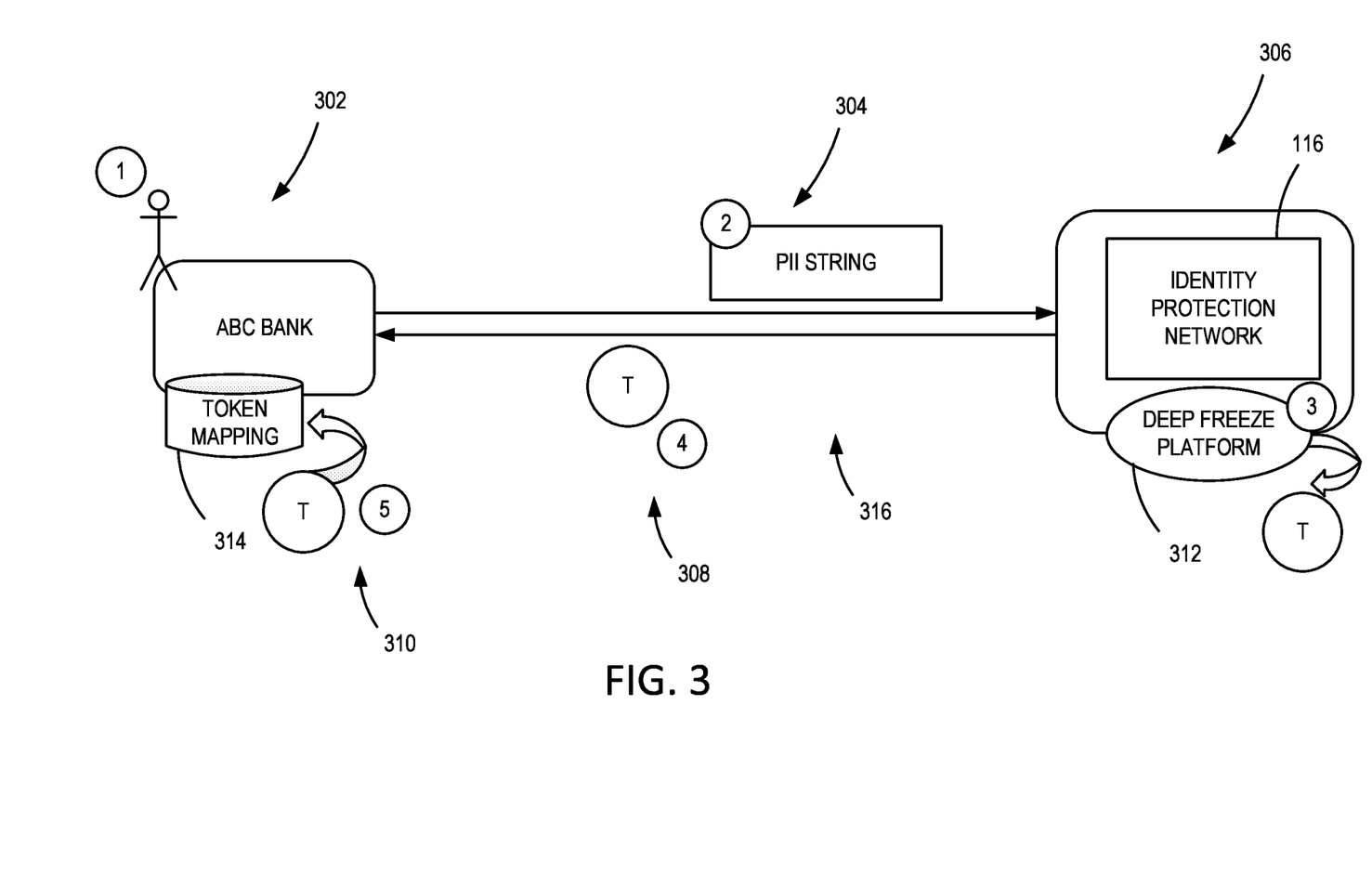
FIG. 3 is a block diagram illustrating an enrollment process flow according to an embodiment.

An enrollment process 300 is shown by the process flow in FIG. 3. The enrollment process 300 is performed in some examples to register different accounts of the user at financial institutions, credit agencies, government administrations, etc. with the system 100 (shown in FIG. 1), such as by using the user interface 200 (shown in FIG. 2). The enrollment process 300 identifies the different accounts of the user at financial institutions, credit agencies, government administrations, etc. that can be subjected to deep freezing according to the present disclosure. The enrollment process 300 begins with the user registering for the deep freeze functionality at 302. That is, the user registers his or her accounts at financial institutions, credit agencies, government administrations, etc. via the user interface 200 in some examples. The registering at 302 also results in the generation of a PII for the user. In one example, a PII string 304 is generated based on the user's surname/social security number/date of birth by a deep freeze application programming interface (API) 316. It should be noted that the PII string 304 can be generated in any suitable manner and can be modified to be based on different or additional information unique to the user (e.g., driver license number). The PII string 304 allows for the exchange of the PII for network transactions or communications a plurality of entities.

In one example, the data corresponding to the PII string is tokenized using token services. That is, the tokenized PII string acts as an identity authentication and/or authorization token used to confirm the user's identity at different entities having user accounts and/or profiles registered as described herein. The tokenized PII string in various examples thereby creates a proxy for the user to allow the system 100 to interact and communicate with the systems of entities at which the user has accounts and/or profiles registered with the system 100.

In some examples, each unique PII string is assigned a unique PII token by the system 100 and associated with the user. More particularly, a deep freeze platform 312 (implementing the deep freeze operation as described herein) is implemented by the identity protection network 116 at 306. That is, the system 100 stores the PII string (such as in the storage 104 shown in FIG. 1) and generates the unique PII token with the identity protection network 116 (e.g., an algorithm generates the unique token based on user specific information). Thus, the deep freeze platform 312 allows for generation of the unique PII token used as part of the deep freeze activation. As part of the enrollment process 300, the PII token is communicated or transmitted (T) at 308 to systems of registered entities in the standard format that is recognizable by each of the systems, for example, based on the user's surname/social security number/date of birth. For example, the identity protection network 116 transmits the PII token to a plurality of banks at which the user has accounts registered with the system 100. It should be noted that if the user is already registered with the deep freeze platform, the system 100 communicates an existing unique PII token to the plurality of banks.

The system at the registering entity, such as the user's local bank server, then stores and maps the PII token against the user's profile in system at 310. In some examples, a token mapping database 314 is maintained at the local system or server to identify each user account registered with the system 100. In various examples, each of the entities at which the user has accounts or profiles registered with the system 100 receives the same unique PII token generated for the user.

Figure 4:
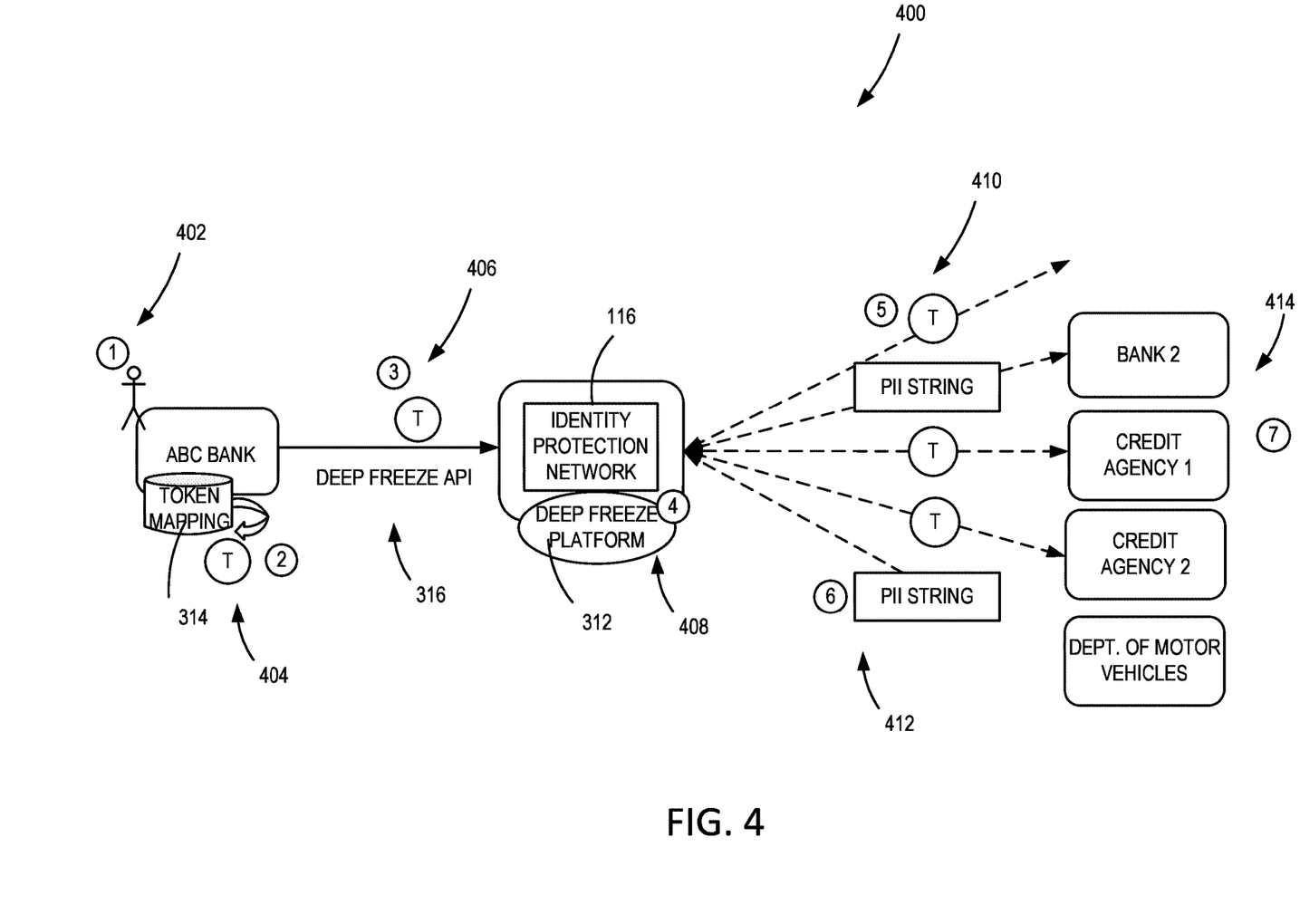
FIG. 4 is a block diagram illustrating an enrollment activation flow according to an embodiment.

Thus, with the enrollment process 300 a plurality of accounts and/or profiles of the user are registered with the system for deep freeze protection. Once registered, activation of the deep freeze protection is easily implemented by accessing the user interface 100 and selecting an activation or deep freeze button 416 that causes deep freeze operations to be performed in connection with the registered accounts and/or profiles. That is, the registered accounts and/or profiles are rapidly placed in a deep freeze state that prevents any activity (e.g., purchases) from being performed in connection with the registered accounts and/or profiles.

An activation process 400 is shown by the process flow in FIG. 4. The activation process 400 is performed in some examples to deep freeze the different accounts of the user at financial institutions, credit agencies, government administrations, etc. with the system 100 (shown in FIG. 1), such as by using the user interface 200 (shown in FIG. 2). In the illustrated example, the user loses his wallet and activates the identity protection, namely the deep freeze at 302. For example, and with reference also to FIGS. 1 and 2, the user accesses the user interface 200 and activates the deep freeze protection with the click of a single button, for example, the activation or deep freeze button 416. Thus, with quick one click activation, the process to halt any activity with registered accounts and/or profiles of the user is initiated. The activation results in the concurrent deep freezing of multiple accounts and/or profiles as described in more detail below.

As a result of the activation by the user at 404, each of the systems at entities having accounts and/or profiles of the user registered with the system 100 (e.g., the bank of the user) are identified and with the PII token mapped to the user's account or profile, such as using the token mapping database 314, the PII token is extracted by the system at which the user enrolled in the deep freeze process (e.g., via the user interface 200 at the user's bank). A deep freeze activation signal or message is then communicated to the systems at the different entities using a message format that the systems recognize as the deep freeze token and an identifier. For example, a message is sent with an identifier to indicate a current deep freeze status. In some examples, a green identifier indicates a test message to confirm that the deep freeze message can be received by the systems (e.g., handshake type process), a yellow identifier to indicate that the user has registered the particular account with the system 100 (opted into deep freeze proception) and to receive authentication, and a red identifier that indicates that the deep freeze has been activated and the user's account or profile should be shut down immediately, such that any activity or transactions are prevented from being performed by the system. These different states will be described in more detail below.

In some examples, at the local systems (e.g., local bank servers), a flag setting is changed that corresponds to the current identifier. For example, the local systems in some examples include an activation flag indicating the deep freeze state of the user's account or profile corresponding to the identifier received in the transmitted message from the system 100. In a credit card example, the flag setting indicates if a payment card associated with the account profile of the user and the related transaction account is active, registered with deep freeze, or that the deep freeze is activated. For example, when the flag indicates that the payment card is active, payment transactions involving the payment card are processed using normal payment transaction processing procedures. When the flag indicates that the payment card is not active (e.g., is frozen by the deep freeze system of the present disclosure), payment transactions involving the payment card are declined.

More particularly, and with respect to notifying the different entities having accounts and/or profiles of the user registered with the system for deep freezing that such operation is desired, after extracting the user's PII token, the system 100, at 406, communicates the user's PII token to the identity protection network 116 using the deep freeze API 316. The identity protection network 116 validates the PII token at 408 using the deep freeze platform 312. That is, the identity protection network 116 authenticates and confirms that the user associated with the PII token is registered by the deep freeze system.

The PII token is then communicated to the systems having accounts and/or profiles of the user registered with the identity protection network 116. In some examples, using deep freeze APIs 316 or in the example where the identity protection network 116 is a payment system network (e.g., Mastercard® network), using payment network channels, the PII token is communicated to both participating and non-participating entities. Participating entities are ones that participate in the identity protection network 116 (e.g., are part of the payment network) and non-participating entities are ones that do not participate in the identity protection network 116 (e.g., are not part of the payment network). More particularly, at 410, the PII token is transmitted (T) to participating entities and an encrypted PII string is transmitted (T) to non-participating entities at 412. As described in more detail herein, the PII string is configured in a standard format. Thus, all participating entities and non-participating entities having accounts and/or profiles of the user registered with the deep freeze system receive a message indicating that deep freeze has been activated.

In response to receiving the PII token or encrypted PII string, each of the entities, at 414, uses the PII token or encrypted PII string to identify the user's account and/or profile and freezes all activity corresponding to the account and/or profile. As described herein, a flag setting at each of the local systems is also changed in some examples to reflect that the account and/or profile is to be in a deep freeze state. The flag setting causes all activity with the account and/or profile of the user to be halted (e.g., all payment transactions are halted). It should be noted that although the entities are illustrated as banks, credit agencies, and the Department of Motor Vehicle, additional or fewer, as well as different entities, can participate in the deep freeze operation according to the examples described herein.

Figure 5:
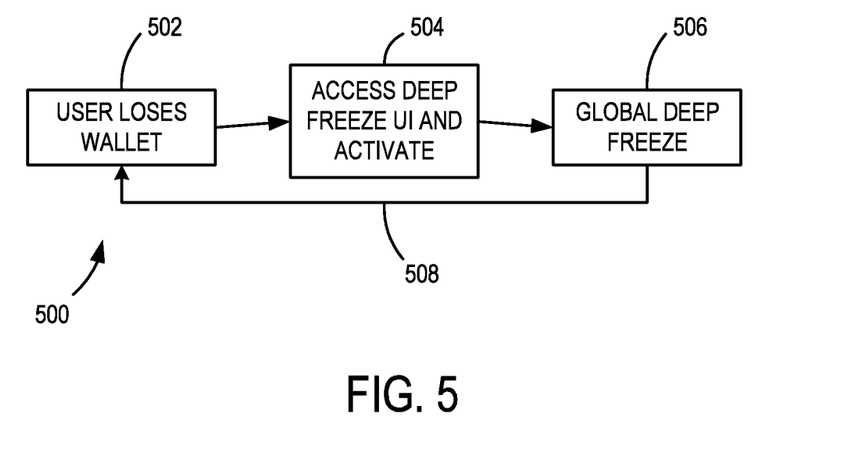
FIG. 5 is a block diagram illustrating a deep freeze flow according to an embodiment.

Thus, a simplified process is provided, such as when the user loses his wallet, to quickly and easily freeze multiple accounts and/or profiles of the user. In various examples, one click deep freeze activation allows for concurrent freezing of multiple accounts and/or profiles of the user at different entities. For example, as shown in FIG. 5, illustrating a deep freeze flow 500, a user loses his or her wallet at 502. The wallet contains multiple credit cards or other cards registered with the deep freeze system. The user then accesses and activates deep freeze functionality at 504, such as using a single button click. The activation results in a global deep freeze at 506. That is, all registered accounts and/or profiles of the user are frozen without having to individually contact each of the entities having the accounts and/or profiles of the user. Feedback 508 can also be provided to confirm that the deep freeze has been locally activated at the accounts and/or profiles of the user have been frozen to prevent any activities being performed with respect to the accounts and/or profiles of the user.

The deep freeze flow 500 is performed in some examples using a combination of a payment network and plurality of local systems. The local systems in one example include a processing server that includes a receiving unit. The receiving unit is configured to receive data over one or more networks via one or more network protocols, which in various examples is a deep freeze message configured in a standard format, which includes a data field having a deep freeze identifier. The processing server includes, in some examples, one or more processing units configured to perform the functions of the processing server, such as to identify an account profile in an account database that corresponds to the received deep freeze request based on the included PII token. In some examples, the processing unit is configured to toggle the activation flag included in the identified account profile to indicate that the payment card has been deactivated due to the status of the payment card being lost or stolen as indicated when a deep freeze message is received. The payment network is then configured to decline payment transactions involving the payment card. In instances where the processing server is configured to process payment transactions, the processing unit declines the payment transactions based on the activation flag. In other instances, the transmitting unit can transmit a notification to a computing device of the payment network that is configured to process the transactions indicating that transactions involving the payment card should be denied.

Figure 6:
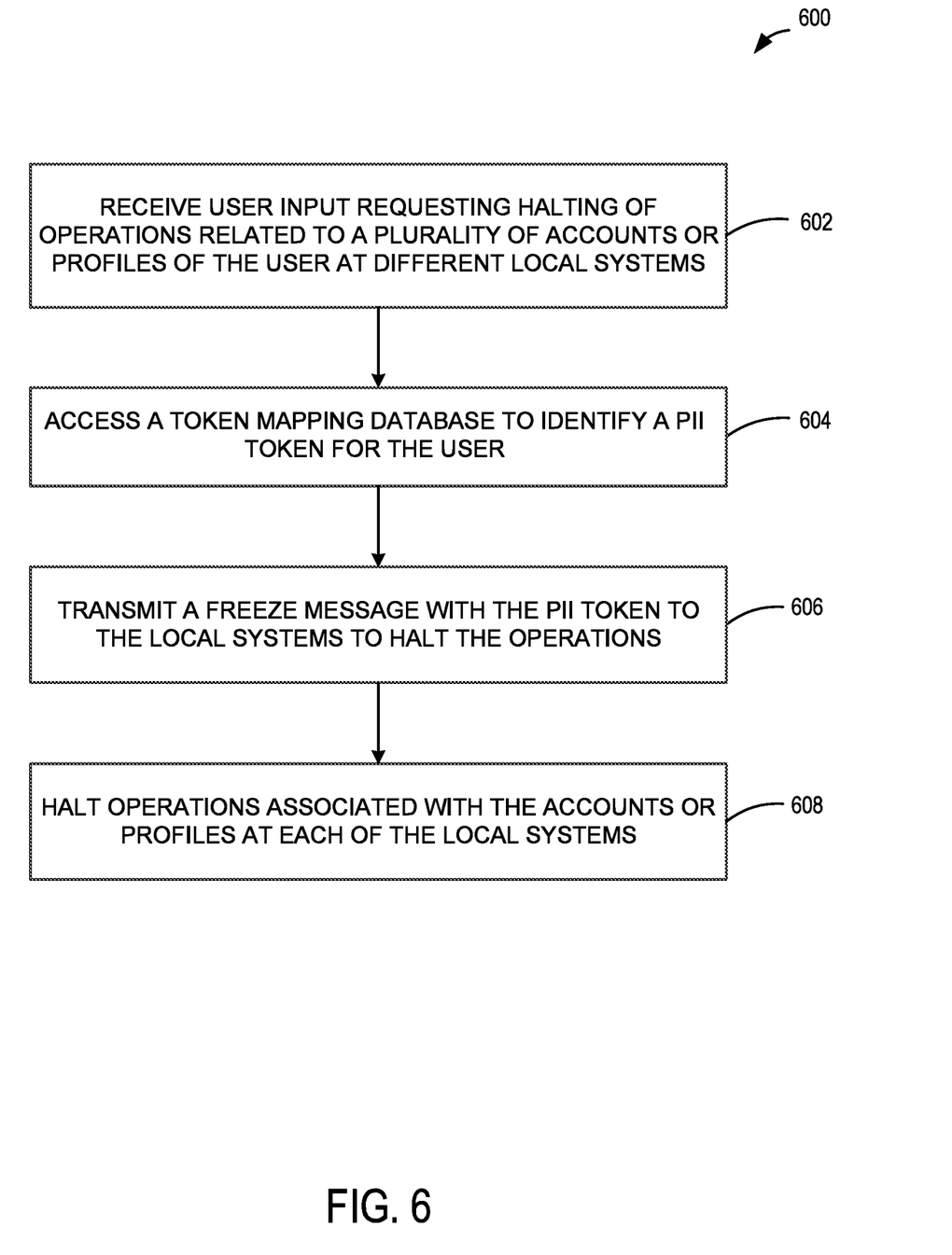
FIG. 6 is a flow chart illustrating operations of a computing device for freezing a plurality of user accounts and/or profiles according to various embodiments.

FIG. 6 illustrates a flow chart of a method 600 for freezing a plurality of user accounts and/or profiles at different entities according to one example. This figure is an example flow chart illustrating operations of a computing device to globally freeze a plurality of user accounts and/or profiles. The operations illustrated in the flow chart described herein can be performed in a different order than is shown, can include additional or fewer operations and can be modified as desired or needed. Additionally, one or more operations can be performed simultaneously, concurrently or sequentially.

With reference to the method 600, the computing device receives a user input at 602 that requests halting (deep freeze) of operations related to a plurality of accounts or profiles of the user at different systems. As described herein, a user registers one or more accounts and/or profiles with the deep freeze system to allow easy halting of the operations (e.g., purchases or other transactions) for each of the accounts and/or profiles.

A token mapping database is then accessed at 604 to identify a PII token for the user. For example, a user registers the accounts and/or profiles and a PII token for the user is generated and stored, which is then later access when deep freeze operation is desired. In various examples, a plurality of PII tokens are mapped to a plurality of corresponding users in the token mapping database.

With the PII token of the user identified, a freeze message with the PII token is transmitted to local systems at 606 to halt operations associated with the user's accounts and/or profiles. For example, as described herein, a message with a deep freeze activation identifier is transmitted to the local systems to cause a deep freeze flag to be generated, resulting in halting of operations of the accounts and/or profiles of the user at the local systems at 608. That is, any transactions or other electronic activities of the user's accounts and/or profiles are halted when the message is received with the deep freeze identifier. Thus, no operations can be performed using the accounts and/or profiles of the user, such that any possible fraudulent activity is prevented.

It should be noted that the user's accounts and/or profiles at the local systems are identified using account databases at the local systems in some examples. The account databases can be configured to store a plurality of account profiles. Each account profile can include data related to a transaction account including an account number, authentication data, and an activation flag. The account number can be a unique value associated with the related transaction account suitable for identification, such as a transaction account number, e-mail address, telephone number, registration number, etc. Authentication data can be used to authenticate the account, such as using a personal identification number, password, biometric data (e.g., fingerprint, retinal scan, etc.), or other suitable type of authentication data.

For example, in a payment setting, a processing server can be configured to freeze or otherwise deactivate the transaction account related to a payment card when the payment card is reported as lost or stolen, for example, as indicated by the activation of the deep freeze operation. In such an instance, the processing server can flag the transaction account (as identified using the account database) such that any transactions that are received that include the payment card as payment are declined until recovery of the payment card or replacement of the payment card has been confirmed.

Thus, the present disclosure allows global deep freezing with one-click activation by utilizing a PII token. As a result, a user does not have to contact multiple different entities, such as when his or her wallet is lost or stolen.

Exemplary Operating Environment

Figure 7:
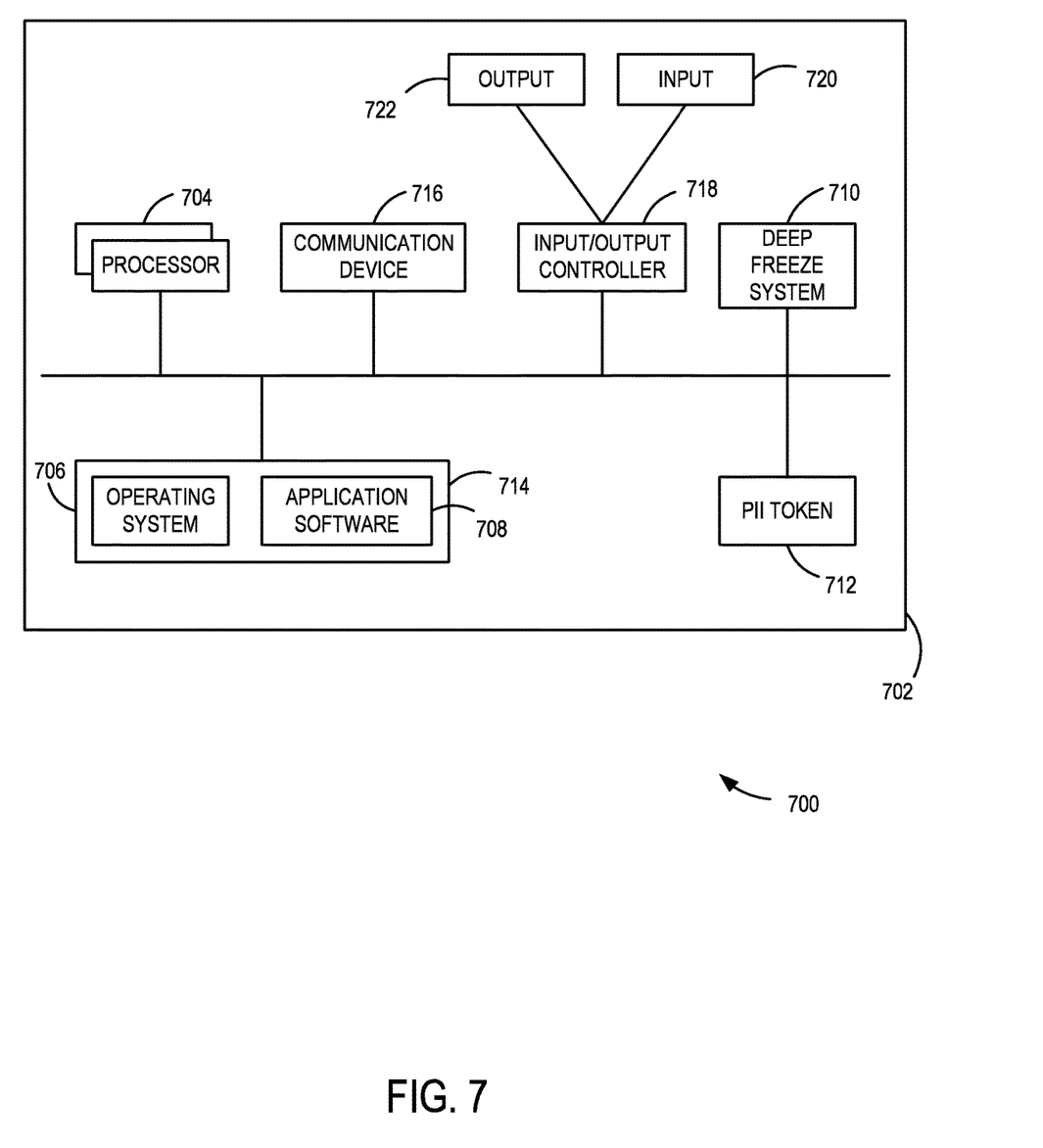
FIG. 7 illustrates a computing apparatus according to an embodiment as a functional block diagram.

The present disclosure is operable with a computing apparatus 702 according to an embodiment as a functional block diagram 700 in FIG. 7. In one example, components of the computing apparatus 702 may be implemented as a part of an electronic device according to one or more embodiments described in this specification. The computing apparatus 702 comprises one or more processors 704 which may be microprocessors, controllers or any other suitable type of processors for processing computer executable instructions to control the operation of the electronic device. Platform software comprising an operating system 706 or any other suitable platform software may be provided on the apparatus 702 to enable application software 708 to be executed on the device. According to an embodiment, freezing of multiple accounts and/or profiles of the user with a deep freeze system 710 using a PII token 712, can be accomplished by software.

Computer executable instructions may be provided using any computer-readable media that are accessible by the computing apparatus 702. Computer-readable media may include, for example, computer storage media such as a memory 714 and communications media. Computer storage media, such as the memory 714, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 714) is shown within the computing apparatus 702, it will be appreciated by a person skilled in the art, that the storage may be distributed or located remotely and accessed via a network or other communication link (e.g. using a communication interface 716).

The computing apparatus 702 may comprise an input/output controller 718 configured to output information to one or more input devices 720 and output devices 722, for example a display or a speaker, which may be separate from or integral to the electronic device. The input/output controller 718 may also be configured to receive and process an input from the one or more input devices 720, for example, a keyboard, a microphone or a touchpad. In one embodiment, the output device 722 may also act as the input device 720. An example of such a device may be a touch sensitive display. The input/output controller 718 may also output data to devices other than the output device 722, e.g. a locally connected printing device. In some embodiments, a user may provide input to the input device(s) 720 and/or receive output from the output device(s) 722.

In some examples, the computing apparatus 702 detects voice input, user gestures or other user actions and provides a natural user interface (NUI). This user input may be used to author electronic ink, view content, select ink controls, play videos with electronic ink overlays and for other purposes. The input/output controller 718 outputs data to devices other than a display device in some examples, e.g. a locally connected printing device.

The functionality described herein can be performed, at least in part, by one or more hardware logic components. According to an embodiment, the computing apparatus 702 is configured by the program code when executed by the processor(s) 704 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A system for identity freezing, the system comprising:
at least one processor; and
at least one memory comprising computer program code, the at least one memory and the computer program code configured to, with the at least one processor, cause the at least one processor to:
receive a user input requesting halting of operations related to a plurality of accounts or profiles of the user at different local systems;
access, in response to receiving the user input, a token mapping database to identify a personally identifiable information (PII) token for the user;
transmit a freeze message with the PII token to the different local systems to halt operations associated with the plurality of accounts or profiles of the user; and
halt, at the different local systems, the operations associated with the plurality of accounts or profiles of the user to freeze an identity of the user.

A computerized method for identity freezing, the computerized method comprising:
receiving a user input requesting halting of operations related to a plurality of accounts or profiles of the user at different local systems;
accessing, in response to receiving the user input, a token mapping database to identify a personally identifiable information (PII) token for the user;
transmitting a freeze message with the PII token to the different local systems to halt operations associated with the plurality of accounts or profiles of the user; and
halting, at the different local systems, the operations associated with the plurality of accounts or profiles of the user to freeze an identity of the user.

One or more computer storage media having computer-executable instructions for identity freezing that, upon execution by a processor, cause the processor to at least:

receive a user input requesting halting of operations related to a plurality of accounts or profiles of the user at different local systems;

access, in response to receiving the user input, a token mapping database to identify a personally identifiable information (PII) token for the user;

transmit a freeze message with the PII token to the different local systems to halt operations associated with the plurality of accounts or profiles of the user; and halt, at the different local systems, the operations associated with the plurality of accounts or profiles of the user to freeze an identity of the user.

Alternatively, or in addition to the examples described above, examples include any combination of the following:

generate a PII string in a standard format for the PII token.

receive a user input registering the plurality of accounts or profiles of the user at a user interface of one of the different local systems.

perform the accessing and transmitting based on a user action activating a single element of a user interface.

wherein the different local systems comprise at least one of credit reporting agencies, banks/financial institutions, government/municipality entities, mobile/telecommunication companies, and utilities.

use a payment network to access the token mapping and transmit the freeze message.

use an application programming interface (API) to communicate data relating to the PII token to an identity protection network that transmits the freeze message.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for generating predicted queries using a neural network. The illustrated one or more processors 704 together with the computer program code stored in memory 714 constitute exemplary processing means for using and/or training neural networks to predict and run queries.

The term comprising is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles a, an, the, and said are intended to mean that there are one or more of the elements. The terms comprising, including, and having are intended to be inclusive and mean that there may be additional elements other than the listed elements. The term exemplary is intended to mean an example of. The phrase one or more of the following: A, B, and C means at least one of A and/or at least one of B and/or at least one of C.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for identity freezing, the system comprising:
    a first computing device comprising:
        a first processor, and
        a first memory storing first computer program code executable by the first processor; and
    a second computing device comprising:
        a second processor; and
        a second memory comprising second computer program code that, when executed by the second processor, cause the second processor to:
            generate a personally identifiable information (PII) string based on data corresponding to a user;
            transmit the PII string to the first computing device;
            receive a PII token from the first computing device;
            store the receive PII token in a token mapping database;
            receive a user input comprising a request to halt operations related to a plurality of accounts or profiles of the user at different local systems;
            access, in response to receiving the user input, the token mapping database to identify the received PII token associated with the user; and
            send the request comprising the received PII token associated with the user to the first computing device;
        wherein the first computer program code, when executed by the first processor, causes the first processor to:
            generate the PII token of the data corresponding to the user in the PII string;
            receive the request comprising the generated PII token associated with the user from the second computing device;
            determine that a first selection of the different local systems comprises participating systems registered with the first computing device;
            determine that a second selection of the different local systems comprises non-participating systems;
            transmit a first freeze message including the generated PII token associated with the user to the determined first selection of the different local systems to halt operations associated with the plurality of accounts or profiles of the user; and transmit a second freeze message including an encrypted version of the PII string to the determined second selection of the different local systems to halt operations associated with the plurality of accounts or profiles of the user.

2. The system of claim 1, wherein the first computer program code, when executed by the first processor, further causes the first processor to: transmit the generated PII token to the determined first selection of the different local systems for mapping to previously transmitted PII token.

3. The system of claim 1, wherein the second computer program code, when executed by the second processor, further causes the second processor to: receive a user input registering the plurality of accounts or profiles of the user at a user interface of one of the different local systems.

4. The system of claim 1, wherein the second computer program code, when executed by the second processor, further causes the second processor to: perform the accessing and transmitting based on a user action activating a single activation element of a user interface.

5. The system of claim 1, wherein the first computer program code, when executed by the first processor, further causes the first processor to: registers the participating systems.

6. The system of claim 1, wherein the first computer program code, when executed by the first processor, further causes the first processor to: transmit the first freeze message including the generated PII token and a color coded identifier indicating a current deep freeze status, and a first color indicates a test message, a second color indicates a confirmation the user has been registered with a particular local system using the generated PII token, and a third color indicates an activation of the freeze of the operations associated with the plurality of accounts or profiles of the user.

7. The system of claim 1, wherein the first computer program code, when executed by the first processor, further causes the first processor to: use an application programming interface (API) to transmit the first freeze message including the generated PII token to the determined first selection of the different local systems.

8. A computerized method for identity freezing, the computerized method comprising:

generating by a second computing device a personally identifiable information (PII) string based on data corresponding to a user;

transmitting by the second computing device the PII string to a first computing device;

generating by the first computing device a PII token of the data corresponding to the user in the PII string;

receiving by the second computing device the PII token from the first computing device;

storing by the second computing device the received PII token in a token mapping database;

receiving by the second computing device a user input comprising a request to halt operations related to a plurality of accounts or profiles of the user at different local systems;

accessing by the second computing device, in response to receiving the user input, the token mapping database to identify the received PII token associated with the user;

sending by the second computing device the request comprising the received PII token associated with the user to the first computing device;

receiving by the first computing device the request comprising the generated PII token associated with the user from the second computing device;

determining by the first computing system that a first selection of the different local systems comprises participating systems registered with the first computing device;

determining by the first computing device that a second selection of the different local systems comprises non-participating systems;

transmitting by the first computing device a first freeze message including the generated PII token associated with the user to the determined first selection of the different local systems to halt operations associated with the plurality of accounts or profiles of the user; and transmitting by the first computing device a second freeze message including an encrypted version of the PII string to the determined second selection of the different local systems to halt operations associated with the plurality of accounts or profiles of the user.

9. The computerized method of claim 8, further comprising transmitting by the first computing device the generated PII token to the determined first selection of the different local systems for mapping to previously transmitted PII token.

10. The computerized method of claim 8, further comprising receiving by the second computing device a user input registering the plurality of accounts or profiles of the user at a user interface of one of the different local systems.

11. The computerized method of claim 8, further comprising performing the accessing and transmitting by the second computing device based on a user action activating a single activation element of a user interface.

12. The computerized method of claim 8, further comprising, wherein the different local systems comprise at least one of credit reporting agencies, banks/financial institutions, government/municipality entities, mobile/telecommunication companies, and utilities.

13. The computerized method of claim 8, wherein: transmitting the first freeze message further comprises updating a flag setting corresponding to a state of the plurality of accounts or profiles of the user, and the flag setting indicates a freeze state of the plurality of accounts or profiles of the user.

14. The computerized method of claim 8, further comprising using an application programming interface (API) by the first computing device to transmit the freeze message including the generated PII token to the determined first selection of the different local systems.

* * * * *